United States Patent [19]

Wada

[11] Patent Number: 4,718,879

[45] Date of Patent: Jan. 12, 1988

[54] DEVICE FOR FITTING AND ADJUSTING AN ENCODER

[75] Inventor: Yasuyuki Wada, Osaka, Japan

[73] Assignee: Dainippon Screen Mfg. Co. Ltd., Kyoto, Japan

[21] Appl. No.: 870,329

[22] Filed: Jun. 3, 1986

[30] Foreign Application Priority Data

Jun. 7, 1985 [JP] Japan .............................. 60-124901

[51] Int. Cl.$^4$ .............................................. F16D 1/12
[52] U.S. Cl. ..................... 464/185; 250/231 SE; 403/4; 403/160
[58] Field of Search ...................... 33/180 R, 529, 534; 248/558, 674; 403/4, 160; 464/102, 106, 147, 149, 185; 250/231 SE

[56] References Cited

U.S. PATENT DOCUMENTS 3,203,285 8/1965 Schmidt ..................... 464/149 X
4,077,657 3/1978 Trzeciak ..................... 403/4 X
4,556,182 12/1985 Bentall et al. .................. 403/160 X

FOREIGN PATENT DOCUMENTS 2033425 3/1978 Fed. Rep. of Germany .... 33/180 R
128814 8/1982 Japan ............................. 250/231 SE
706597 12/1979 U.S.S.R. ................................. 403/4

Primary Examiner—Daniel P. Stodola
Attorney, Agent, or Firm—Lowe, Price, Leblanc, Becker & Shur

[57] ABSTRACT

A device for fitting and adjusting an encoder comprising a first inclined plate and a second inclined plate joined together rotatably between an encoder fitting surface and a fitting flange, a joined surface between the two inclined plates being slightly inclined to a surface orthomic to the axis of a rotation shaft while remaining surfaces on the opposite side of each plate being orthogonal to the axis, so that the rotation shaft of a rotatable body is in parallel to a rotations shaft of the encoder by adjustment of either plate or both.

1 Claim, 6 Drawing Figures

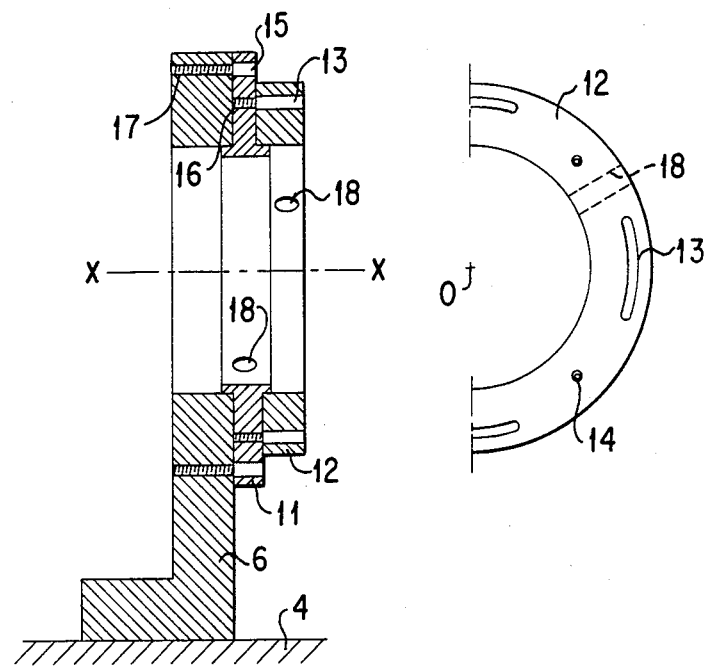
FIG. 1
FIG. 2
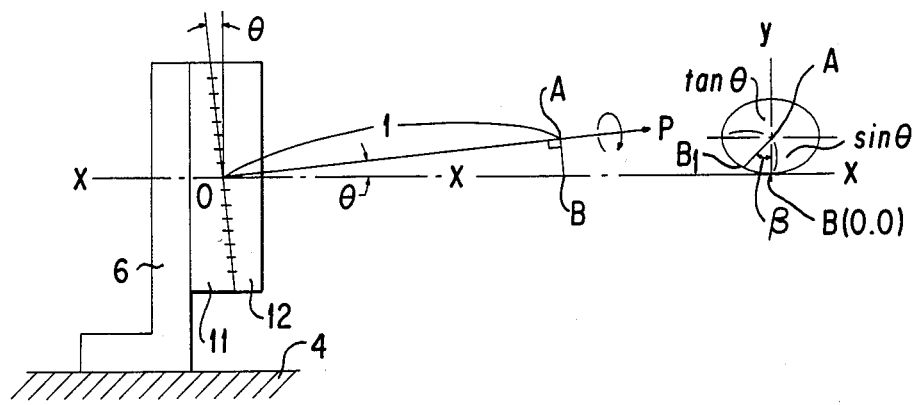
FIG. 3

DEVICE FOR FITTING AND ADJUSTING AN ENCODER

BACKGROUND OF THE INVENTION

1. Field of the Invention

This invention relates to a device for fitting and adjusting an encoder in which, when a rotation shaft of a scanning drum in a drum type image scanning and recording apparatus is joined to a rotation shaft of an encoder through a diaphragm type coupling or the like so that a rotating angular speed of the former may be exactly transmitted to the latter, error in transmission of the rotating angular speed due to deviation of squareness between a flange and a rotation shaft of an encoder itself can be corrected.

2. Prior Art

In a drum type image scanning and recording apparatus, when, for example, a scanning drum on the peripheral surface of which an original picture is mounted and a recording drum on the peripheral surface of which a photosensitive material such as film is mounted, are respectively rotated at a specified angular speed, a reproduced image of said original picture is supposed to be recorded either at full or magnified size on said photosensitive material. For that purpose, the apparatus is usually equipped with a timing signal generating means to control various timings at the time of recording such reproduced image. As one of such means a rotary encoder is connected with each rotation shaft of the scanning drum on the original picture reading side and the recording drum on the recording side thereof through a coupling adapted to the encoder. Accordingly, it is required for such coupling to accurately transmit rotation of the rotation shaft of said drums to a shaft of the encoder.

Generally, when joining a drive shaft such as a rotation shaft of the scanning drum to the rotation shaft of the encoder through a coupling, it is very difficult to connect both rotation shafts coaxially for reasons of machining accuracy of a supporting bracket, flanges, bearings, etc. Hence, as a coupling satisfying the aforementioned requirement even when both rotation shafts are not coaxial (i.e., a coupling enabling transmission of equal angular speed), a so-called diaphram type coupling is widely used. According to such diaphram coupling, even though the rotation shafts of the drum and the encoder are not coaxial, transmission of an equal angular speed is supposed to be possible, so far as it is established that angles $\theta_1$ and $\theta_2$ made among axes of the coupling shaft (1), drum rotation shaft (2) and encoder rotation shaft (3) on the same plane (on a paper in this case) are equal to each other as shown in FIG. 4. In such arrangement, however, if the encoder rotation shaft (3) moves a slight distance in the same plane, for example, as shown in two dot chain lines in FIG. 4 $\theta_1'$ is not equal to $\theta_2'$ ($\theta_1' \neq \theta_2'$) and the angular speed cannot be transmitted from the drum rotation shaft (2) to the encoder rotation shaft (3).

On the other hand, as shown in FIG. 5, if the drum rotation shaft (2) and the encoder rotation shaft (3) are parallel to each other in the same plane (a paper in this case), the angles made among the axes of the coupling shaft (1), drum rotation shaft (2) and encoder rotation shaft (3) must be $\theta_1 = \theta_2$, $\theta_1' = \theta_2'$ as shown by the two dot chain lines in FIG. 5 even when aforementioned parallel movement occurs in the same plane, and the equal angle speed can be transmitted from the drum rotation shaft (2) to the encoder rotation shaft (3).

Heretofore, a fitting device of such encoder comprises a bracket (6) fixed to a base (4) and by which an encoder (E) is coaxially fitted to the rotation shaft (2) of a drum (D) at its flange portion (5). This fitting bracket (6) is fixed to the base (4) so that a surface to which the flange portion (5) is fitted is orthogonal to the drum rotation shaft (2). Then, a diaphram coupling (C) is coaxially connected to the drum rotation shaft (2) and fitted to a shaft end portion of an extended shaft (2') having the same diameter as the rotation shaft (3) of the encoder (E) and a shaft end portion of the encoder rotation shaft (3).

Accordingly, unless there is no error at all in the squareness between the fitting surface of the flange portion (5) of the encoder (E) and the rotation shaft (3) thereof, the aforementioned parallel relation is established between the drum rotation shaft (2), i.e., the extended shaft (2') and the encoder rotation shaft (3), and even when there is slight offset between both shafts (2'), (3), transmission of equal angular speed is supposed to be carried out from the drum rotation shaft (2) to the encoder rotation shaft (3).

3. Problem to be Solved

It is true that an equal angular speed is sometimes not transmitted as designed from the drum rotation shaft (2) to the rotation shaft (3) of the encoder (E) fitted on the conventional encoder fitting device. As a result of investigations, it is found that such problem is caused by a slight angle error in the squareness between the fitting surface of the flange portion (5) of the encoder (E) and the rotation shaft (3) thereof. Such error can be corrected by machining the fitting surface of the flange portion (5) on the basis of the rotation shaft (3), but such correction is rather troublesome requiring much labor and time.

SUMMARY OF THE INVENTION

Accordingly, an object of the invention is to provide an improved encoder fitting and adjusting device in which troublesome correction is replaced with a simple adjusting operation at the time of fitting an encoder, whereby a drum rotation shaft and an encoder rotation shaft are kept in a parallel relation therebetween.

In order to accomplish the foregoing object, a device for fitting and adjusting an encoder according to the invention is arranged as follows.

That is, the technique of the invention involves a device for fitting and adjusting an encoder connected to a rotation shaft of a rotatable body through a diaphram type coupling or the like, and wherein a fitting surface on which an encoder for transmitting rotation of equal angular speed of said rotation shaft is fitted is formed orthogonal to an axis (X—X) of the rotation shaft of said rotatable body, and a fitting, bracket having a through hole around said axis (X—X) is fixed to a base, said device being characterized in that A first inclined plate having a through hole is joined to a fitting surface of said bracket so that the through hole and that of said bracket may be coaxial, a second inclined plate having a through hole is held on the opposite side of said joined surface of the first inclined surface so that the through hole and that of said first inclined plate may be coaxial, the joined surface between said first and second inclined surfaces are not orthogonal to said axis (X—X)

but formed into a gentle inclined surface with a slight inclination, in normal condition, respective opposite sides to the joined surface between said first and second inclined plates (the opposite side of the second inclined plate is used as the encoder fitting surface) are kept parallel to each other so as to be orthogonal to said axis (X—X), and both first and second inclined plates are rotatable.

Since the encoder fitting adjusting device according to the invention is arranged as above, when the second and first inclined plates are fixed by appropriately rotating them so that an angle made between the axis (X—X) and a normal line in the encoder fitting surface may be equal to an inclination which is an error in a preliminarily measured squareness between the fitting surface on the encoder and the rotation shaft thereof and that said inclination is offset as such position as said angle becomes equal to the inclination, the rotation shaft of the encoder is kept in parallel to the rotation shaft of the rotatable body, and accordingly by joining each rotation shaft together at their shaft end portions through a diaphram type coupling, rotation can be exactly transmitted from the rotation shaft of the rotatable body to the rotation shaft of the encoder.

Thus, in the device for fitting and adjusting an encoder according to the invention, a slight deviation in the squareness between the flange surface for fitting the encoder and the rotation shaft thereof is substantially cancelled by rotating the annular inclined plates at a large angle. This means an adjustment for keeping the rotation shaft of the rotatable body and that of the encoder in parallel to each other can be quite easily performed, and hence an equal angular speed can be exactly transmitted from the rotation shaft of the body to that of the encoder by using a diaphragm type coupling, for example.

BRIEF DESCRIPTION OF THE DRAWINGS

FIG. 1 is a sectional side view showing an essential part of a device for fitting and adjusting an encoder which is an embodiment of the invention;

FIG. 2 is a partial plan view of a second annular inclined plate thereof;

FIG. 3 is an explanatory view of the principle of the adjusting operation in the device of this embodiment;

DESCRIPTION OF THE PREFERRED EMBODIMENT

Described hereinafter is a embodiment of the present invention in which a rotation shaft of a scanning drum and a rotation shaft of an encoder in a drum type image scanning and recording apparatus are joined together through a diaphragm type coupling with reference to the accompanying drawings.

Figure 4:
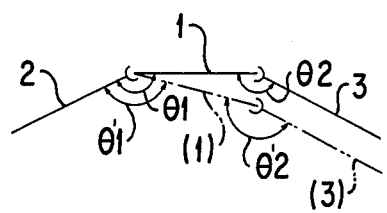
FIGS. 4 and 5 are explanatory views showing typically a relation between two rotational shafts joined together through a coupling shaft.
Figure 5:
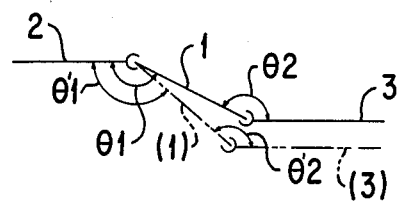
Figure 6:
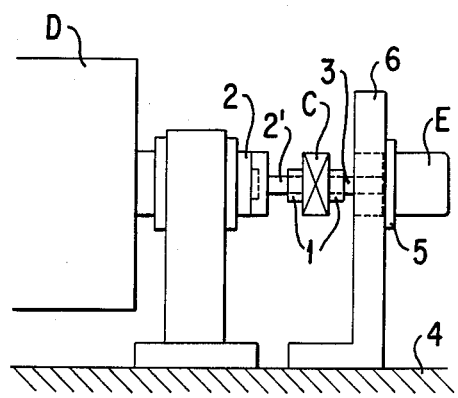
FIG. 6 is a side view of known device.

The device of FIG. 1 comprises a conventional bracket (6) shown in FIG. 6 to which a first annular inclined plate (11) and a second annular inclined plate (12) are added. A joined surface between the first and second annular inclined plates (11), (12) is not orthogonal to the axis (X—X) of said drum rotation shaft (2) but formed into a gentle inclined surface making a slight angle $\theta(\theta=0.5°$ approx. for example) to an arthotomic surface with the axis (X—X) as shown in FIG. 3. Accordingly, in the normal condition illustrated, a joined surface between the first annular inclined plate (11) and the bracket (6) is kept in parallel to a joined surface between the second annular inclined plate (12) and a flange portion (5) of said encoder, and both of these joined surfaces are orthogonal to the axis (X—X) of the drum rotation shaft (2).

The first annular inclined plate (11) has projecting engaging portions, a left one engaging with an inner peripheral surface of the bracket (6) while a right one engages with the second annular inclined plate (12). As shown in FIG. 2, a plurality of or arcuate slots (13) for set bolts are formed (for example, 4 slots) on the second annular inclined plate (12) to connect it rotatably with the first annular inclined plate (11), and tapped holes (14) are formed in the intermediate points between each two slots (13) for fitting the encoder (E). Further, although not illustrated in the form of a plan view, a plurality of or arcuate slots (15) (4 slots, for example) are formed correspondingly on the first annular inclined plate (11) for the set bolts to connect it rotatably with to the bracket (6), and a plurality of tapped holes (16) (12 holes, for example) for said set bolts are formed on a circumference of the first plate (11) having the same diameter as the circumference of the second annular inclined plate (12) on which the arcwise slots (13) are formed. A plurality of tapped holes (17) for said set bolts are formed on a circumference of the bracket (6) having the same diameter as the circumference of the first annular inclined plate (11) on which the arcwise slots (15) are formed.

Accordingly, by fixing the first annular inclined plate (11) to the fitting bracket (6) by said set bolts, the second annular inclined plate (12) can be turned to get a required position by a turning rod inserted in a through hole (18) radially formed on the second annular inclined plate (12) under the state that the set bolts between the first and second annular inclined plates (11), (12) are removed. Then the second annular inclined plate (12) can be fixed to the first annular inclined plate (11) by said set bolts. Such fixation can be applied in almost the same manner when fixing the first annular inclined plate (11) to the fitting bracket (6).

Operation of this device is described hereunder.

First, an angle made between the rotation shaft (3) of the encoder (E) and the fitting surface of the flange portion (5), i.e., an inclination ($\phi$) between the axis of the rotation shaft (3) and the normal line of said fitting surface is measured.

Then, under the state that the set of bolts for fixing the first annular inclined plate (11) to the bracket (6) is taken off, the first annular inclined plate (11) is rotated so as to be in an angle range possible to be corrected by the rotation of the second annular inclined plate (12) alone, and then by turning the second annular inclined plate (12), the second annular inclined plate (12) is fixed to the first plate (11) by said set bolts at a rotation angle position where the angle made between the normal line on the surface for fitting the flange portion (5) of the encoder (E) and the axis (X—X) of said drum rotation shaft (2) is equal to said inclination ($\phi$).

When the encoder (E) is fixed to the second annular inclined plate (12) arranged as above at the flange portion (5), since the rotation shaft (3) of the encoder (E) is in parallel to the rotation shaft (2) of the drum (D), rotation of an equal angular speed is exactly transmitted from the drum rotation shaft (2) to the encoder rotation shaft (3) by connecting of a shaft end surface of the extended shaft (2') of the rotation shaft (2) with that of the rotation shaft (3) under said parallel state.

In the case of rotating the second annular inclined plate (12) alone of the two inclined plates (11) (12) under the normal state shown in FIG. 1, a relation between the inclination ($\phi$) made between the axis (X—X) and the normal line of the encoder fitting surface of the second annular inclined plate (12) and a rotation angle ($\beta$) can be calculated by the underdescribed process. By graduating such relation on the joined surface area of the first and second annular inclined surfaces as shown in FIG. 3, the encoder fitting operation can be carried out more easily using the graduations, i.e., scales.

Described hereunder is a process for calculating the relation between the inclination ($\phi$) and the rotation angle ($\beta$).

Referring to FIG. 3, a normal line $\overline{OP}$ is drawn from the center (0) of the first annular inclined plate (11). An angle made between the axis (X—X) of the drum rotation shaft (2) and the normal line $\overline{OP}$ is equal to an inclination ($\theta$) made by the joined surface between the first and second annular inclined plates (11) (12). Then a point (A) is established on the normal line $\overline{OP}$ which is distant from the point (0) by an unit length 1, and a point (B) is further established at an intersection point of a line perpendicular to the normal line $\overline{OP}$ with the axis (X—X).

The second annular inclined plate (12) is turned clockwise through ($\beta°$) on the normal line $\overline{OP}$ as indicated by the arrow. Considering that the point (B) moves to a point (B$_1$) by such turning and establishing this point (B) as the origin (0,0,) in the shown coordinates (x, y), the coordinates (x$_1$, y$_1$) of the point (B$_1$) can be expressed as follows:

$x_1 = \tan\theta \cdot \sin\beta$
$y_1 = \sin\theta - \sin\theta \cdot \cos\beta = \sin\theta(1-\cos\beta)$
And $\overline{BB_1} = (x_1^2 + y_1^2)^{\frac{1}{2}}$ is obtained.

Further, establishing the inclination ($\phi$) made between the line $\overline{OB_1}$ and the axis (X—X), the following expression is obtained:

$$\phi = \sin^{-1}\left(\frac{\overline{BB_1}}{1/\cos\theta}\right) = \sin^{-1}(\overline{BB_1} \cdot \cos\theta)$$

Since the inclination ($\theta$) of the joined surface between the first and second annular inclined surfaces (11) (12) is known (0.5°, for example), it is possible to obtain the inclination ($\phi$) made between the normal line on the second annular inclined plate (12) and the axis (X—X) when the second plate (12) is turned by ($\beta°$) with respect to the first annular inclined plate (11).

In this manner, the inclination ($\phi$) produced when turning the ($\beta$) every 2° or 5° is calculated to be graduated on the joined area of the inclined plates (11) (12).

It is also possible to make a table of the relation between ($\phi$) and ($\beta$) to use for the adjustment.

In addition, a diaphram type coupling is used as a joint in the above described embodiment, but the invention includes an arrangement using two universal joints (hook joint) through an intermediate shaft or ejual speed ball pjoints, which is the same as the embodiment form the view point of principle.

I claim:

1. A device for fitting and adjusting an encoder having a flange and an encoder rotation shaft connected to a rotation shaft of a rotatable body through a diaphragm type coupling means to obtain rotation of the encoder shaft at equal angular speed to that of said rotation shaft, comprising a bracket receiving a coupling shaft of the coupling; a first inclined plate and a second inclined plate both rotatably disposed between an encoder fitting surface of the bracket and the flange, a joined surface formed by and between the first inclined plate and the second inclined plate being slightly inclined with respect to a surface orthogonal to the axis of the rotation shaft of the rotatable body, while surfaces of said first and second inclined plates on the opposite sides, respectively, of said joined surface being respectively generally orthogonal to the axis of said rotation shaft, so that the rotation shaft of the rotatable body may be generally parallel to the rotation shaft of the encoder through adjustment by turning one of the first inclined plate and the second inclined plate, said first annular inclined plate having a projecting engaging portion comprising one portion section adapted to engage with an inner peripheral surface of the bracket and another portion section adapted to engage with the second annular inclined plate; the second annular inclined plate being formed thereon with a plurality of arcuate slots circumferentially spaced from each other for reception of set screws for rotatable connection with the first annular inclined plate, and means in the second annular inclined plate formed intermediate two of the arcuate slots for fitting the encoder to the second annular inclined plate; the first annular inclined plate also being formed with a plurality of circumferentially spaced arcuate slots for reception of set bolts for rotatable connection to the bracket, and plural tapped holes for reception of set bolts, said tapped holes being formed on the circumference thereof; said bracket having tapped holes circumferentially spaced from each other for reception of said set bolts.

* * * * *